(12) United States Patent
Rana et al.

(10) Patent No.: US 7,894,432 B2
(45) Date of Patent: Feb. 22, 2011

(54) APPARATUS AND METHOD CREATING VIRTUAL ROUTING DOMAINS IN AN INTERNET PROTOCOL NETWORK

(75) Inventors: Ashwin Vishanji Rana, Plano, TX (US); Milton Andre Lie, McKinney, TX (US); Robert Harold Walls, Carrollton, TX (US); Robert Daniel Maher, III, Plano, TX (US)

(73) Assignee: Audiocodes, Inc., Plano, TX (US)

( * ) Notice: Subject to any disclaimer, the term of this patent is extended or adjusted under 35 U.S.C. 154(b) by 1181 days.

(21) Appl. No.: 11/103,099

(22) Filed: Apr. 9, 2005

(65) Prior Publication Data

US 2006/0227758 A1   Oct. 12, 2006

(51) Int. Cl.
   *H04L 12/28* (2006.01)
(52) U.S. Cl. .................. 370/392; 370/395.21; 370/397; 370/399; 370/401; 370/409
(58) Field of Classification Search .................. 370/392, 370/397, 399, 395.21, 409, 395, 52, 395.53, 370/389, 356, 468, 230.1
   See application file for complete search history.

(56) References Cited

U.S. PATENT DOCUMENTS

| | | | | |
|---|---|---|---|---|
| 6,104,700 | A * | 8/2000 | Haddock et al. | 370/235 |
| 6,771,662 | B1 * | 8/2004 | Miki et al. | 370/469 |
| 7,610,332 | B2 * | 10/2009 | Barbir et al. | 709/203 |
| 7,624,195 | B1 * | 11/2009 | Biswas et al. | 709/245 |
| 2002/0037010 | A1 * | 3/2002 | Yamauchi | 370/395.53 |
| 2002/0071418 | A1 | 6/2002 | Gouret et al. | 370/338 |
| 2002/0085488 | A1 * | 7/2002 | Kobayashi | 370/216 |
| 2002/0087711 | A1 | 7/2002 | Leung | 709/233 |
| 2003/0112755 | A1 * | 6/2003 | McDysan | 370/230 |
| 2003/0131245 | A1 * | 7/2003 | Linderman | 713/176 |
| 2004/0017816 | A1 * | 1/2004 | Ishwar et al. | 370/395.53 |
| 2004/0028064 | A1 * | 2/2004 | Cetin et al. | 370/409 |
| 2004/0177157 | A1 * | 9/2004 | Mistry et al. | 709/241 |
| 2004/0202171 | A1 * | 10/2004 | Hama | 370/395.1 |
| 2004/0223497 | A1 * | 11/2004 | Sanderson et al. | 370/395.52 |
| 2006/0013209 | A1 * | 1/2006 | Somasundaram | 370/389 |
| 2006/0013211 | A1 * | 1/2006 | Deerman et al. | 370/389 |

OTHER PUBLICATIONS

PCT Notification of Transmittal of the International Search Report and the Written Opinion of the International Searching Authority, or the Declaration dated Jul. 16, 2008, for PCT Application No. PCT/IB06/00808, 12 pages.

* cited by examiner

*Primary Examiner*—Daniel J Ryman
*Assistant Examiner*—Thinh D Tran
(74) *Attorney, Agent, or Firm*—Haynes and Boone, LLP

(57) ABSTRACT

A method and apparatus is described that allow the creation of virtual routing domains in an IP network. These virtual routing domains allow individual networks to be configures so that it appears that its routing domain covers the entire IP address space. A network processing system is used to implement the virtual routing domains and to allow network traffic to cross the individual routing domains. The network processing system is able to use application layer information to allow the crossing of virtual routing domain boundaries. By examining application layer information the network processing system is able to look up customer/user information and use that information to determine destination virtual routing domains and route otherwise unroutable addresses between domains.

15 Claims, 6 Drawing Sheets

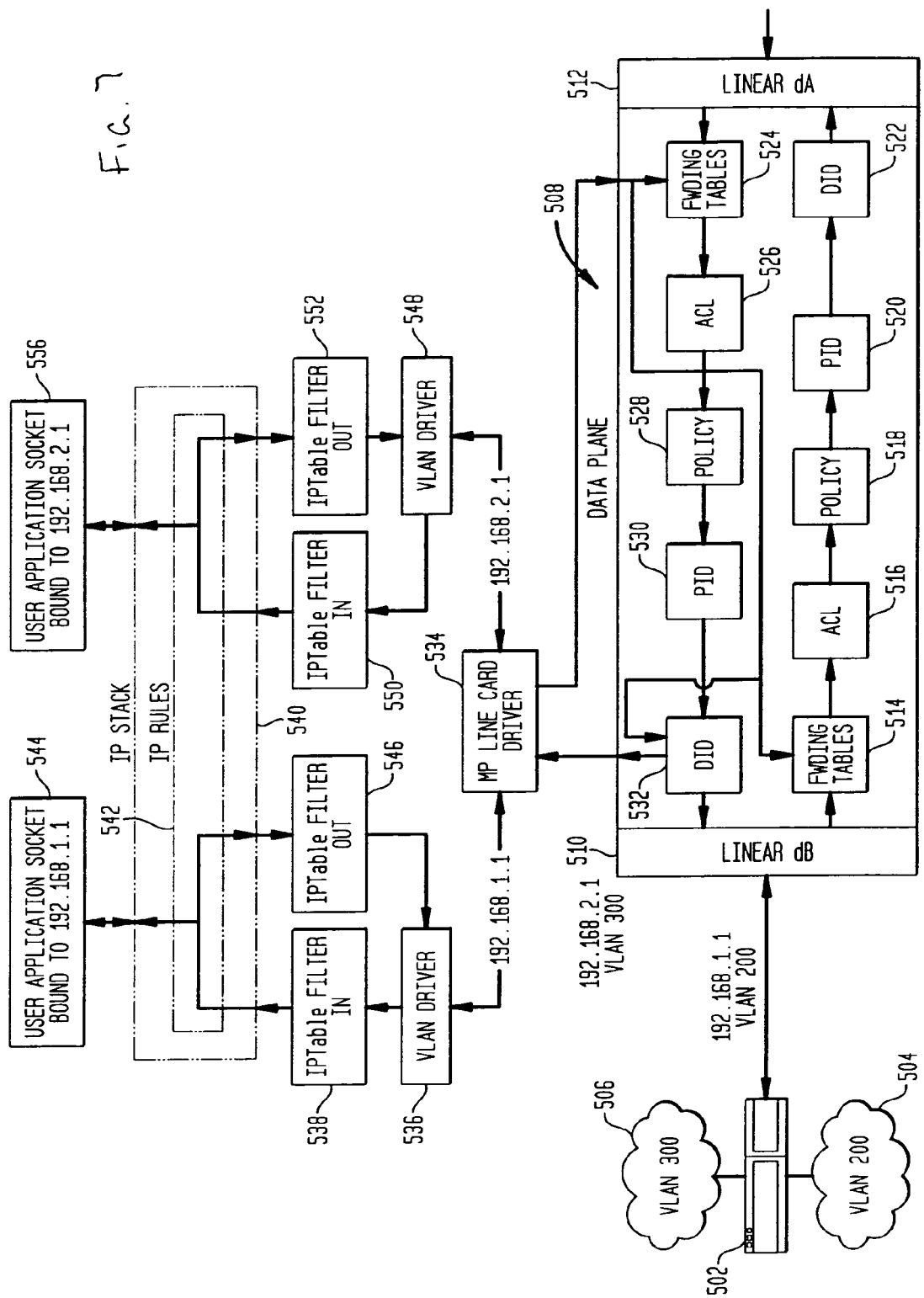

APPARATUS AND METHOD CREATING VIRTUAL ROUTING DOMAINS IN AN INTERNET PROTOCOL NETWORK

TECHNICAL FIELD OF THE INVENTION

The present invention relates to broadband data networking equipment. Specifically, the present invention relates to a network processing system which enables the creation of virtual routing domains (VRDs) in an Internet Protocol ("IP") network having both public and private domains.

BACKGROUND OF THE INVENTION

Current networks are comprised of elements built on a forward and forget paradigm with information about the network scattered across many network devices. Further the number of IP addresses is insufficient to provide a unique address to every piece of equipment on the network. As a result of the lack of sufficient IP addresses, and many enterprise networks choosing to use the private address space, many networks have private IP addresses that overlap with private addresses in other networks. In addition to use of private address space many entities need to secure their networks even while those networks use network infrastructure provided by others.

Tunneled traffic networks ("TTNs") such as virtual private networks ("VPNs") and virtual local area networks ("VLANs"), as well as networks using tunneling protocols such as multi-protocol label switching ("MPLS"), IPSec, L2TP, and asynchronous transfer protocol ("ATM"), were developed to allow companies with multiple physical locations to create a secure, single enterprise network that is transparent to the user. This is accomplished by the enterprise turning over much of the network infrastructure to carriers, such as MCI, AT&T, Southwestern Bell, etc., who connect the remote locations across their own publicly addressed private networks.

To make a TTN (reference to TTNs will hereinafter imply a reference to any network structure using tunneling, including, but not limited to, those listed above) work since there can be overlapping IP addresses used among the different TTNs being hosted by the carrier or even at the individual physical locations, information identifying the particular TTN being used must be added to the layer three information inside the packet which includes the source address information.

These TTNs make it impossible for most existing network equipment to route between them because of the overlapping addresses and the lack of knowledge about the characteristics of each of the TTNs in the network equipment.

Accordingly, what is needed is a method and device for creating virtual routing domains in IP networks.

SUMMARY OF THE INVENTION

The present invention provides for a method and apparatus to create virtual routing domains in an IP network. Virtual routing domains are the ability to support routing decisions for a given routing domain as if the routing domain covers the entire IP address space. Each virtual routing domain has its own interfaces route tables and derived forwarding tables associated with it.

A method for creating virtual routing domains is described that involves mapping ingress port/logical interface information with layer two tunneling protocol identifiers to a specific virtual routing domain. Policies set for that specific virtual routing domain determine the treatment of flows going to and from the domain. To determine treatment for the egress traffic, application layer information is examined to find out the identity of the end customer/user. The end customer/user will have a second virtual routing domain associated with it and that virtual routing domain is used along with the destination address in the packet to determine next hop and tagging for the packet.

Additionally, a network processing system operable to create virtual routing domains is described. The network processing system includes ingress ports, one or more processors able to map the ingress port/logical interface information and the tunneling protocol information to a virtual routing domain. The virtual routing domain has policies set for it that determine the treatment and routing of the traffic coming from it. To determine egress paths and tagging, application layer information is examined by the one or more processors and the end customer/user is identified and its virtual routing domain is determined. That virtual routing domain along with the next hop information is used to determine egress treatment and tagging The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 3 is a table showing the mapping of information from ingress flows to virtual routing domain information;

FIG. 4 is a table showing the mapping of information for egress flows to routing/next hop/tagging information;

FIG. 7 is a block diagram of an embodiment of the software in the network processing system.

DETAILED DESCRIPTION OF THE DRAWINGS

Figure 1:
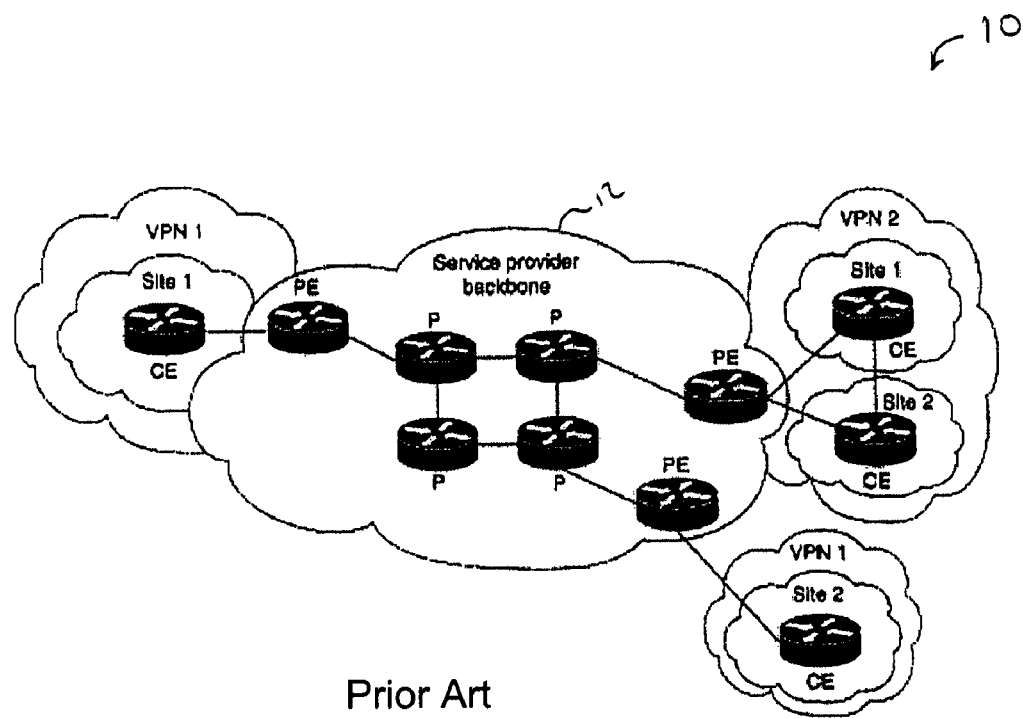
FIG. 1 is a simplified diagram of a prior art multiple virtual private networks connected to a service provider backbone.

Referring now to FIG. 1, a simplified network diagram is presented showing prior art architecture 10. Network 10 shows virtual private networks VPN-1 and VPN-2 connected to a service provider backbone 12 using provider edge routers PE. Core routers P route information through the service provider's network 12. VPNs are provided by service providers and used by customers, to provide security and quality of service across their networks. VPNs, which use customer edge routers CE to communicate to service provider network 12, also allow customers to use private IP address space across their internal network, eliminating the need to have a public IP address for every device in the network.

VPN-1 and VPN-2 use tunneling protocols such as multi-label protocol switching, IPSec or ATM which add information identifying the particular VPN to the header information in the IP flows inside service provider network 12, thereby eliminating the need for network address translation (NAT) or network address/port translation (NAPT) within network 12. Data from VPN-1 or VPN-2 intended for the public network, or Internet, must pass through a NAT/NAPT device to have the private IP addresses used on the VPNs changed to public addresses routable on public network.

Network 10 provides multiple problems for peer-to-peer or real-time applications such as voice-over-IP that include IP address and port information in their message payloads. The private addressing scheme of the VPN is not routable outside of the VPN. To connect to another IP network such as the Internet, a NAT/NAPT router is required to map the private VPN IP address to a public IP, or layer three, address which is then routable on any other IP network. This scheme, described by RFC 1631 of the Internet Engineering Task Force ("IETF"), works very well for data applications, but as said, does not work for protocols with address information in their payload, such as session initiation protocol ("SIP"), IP voice protocol H.323, or media gateway control protocol ("MGCP").

NAPT devices do not examine or alter the payload information of the packets they process. As a result passing protocols, such as those VoIP protocols listed, with address information in the payload through a NAPT device result in return communications dependent on the private IP address in the payload for processing being undeliverable, because the network routers will be unable to process the private address used by the return flow.

Compounding the NAT problem is the fact that it is very common for voice VPN networks utilizing private IP addressing schemes to have overlapping IP addresses. For example VPN-1 and VPN-2 can have IP phone with the same private IP address. While routing that IP address within VPN-1, for example, is not a problem, trying to route that IP address to VPN-2 presents a problem since there is no way of knowing outside of VPN-2 where that private address would end up if anywhere. Trying to map the private addresses to public addresses for routing between VPN-1 and VPN-2 results in the same problems described above in relation to NAPT devices.

While the problems with private addressing schemes are being described with relation to VoIP traffic and protocols, one skilled in the art will understand that the same problems will occur with other layer seven applications such as real-time video, real-time fax, or other applications that may contain information about the ultimate destination in the application layer information within the packets.

One of the biggest causes of the problems with network 10 is the fact that the information about the network is scattered amongst many network devices, with each network device essentially having only information about those devices to which it is connected. Additionally, most network devices use a forward and forget paradigm to route data in the network. Forward and forget means that the network device receives a packet, looks up next hop information and sends the packet to that address. The device looks at just the elements of the packet header required to send it along and retains no information about the packet that could be used to help forward other packets in the same flow.

To overcome the problems associated with network 10, a new paradigm is needed that is able to remember information about each packet and use that information to treat other packets in the same flow, or even in other flows that are related to the packet. Additionally, the new paradigm would be able to use more information in the packet to aide in treating and forwarding the packet, such as information not only in the level 2 and level 3 headers, but also information in the layer 7 application portion of the packet, the application information. An example of application information would be the information in SIP control packets, which contain information about the caller, the callee and the attributes of the call being placed.

Further, the new paradigm should include a single point of contact between a TTN or customer, or enterprise network and the rest of the public and private network space. This would allow the customer's network to appear as if its routing domain covered the entire IP address space. This new paradigm would allow for host of new services that are impossible for the network architecture in FIG. 1.

Figure 2:
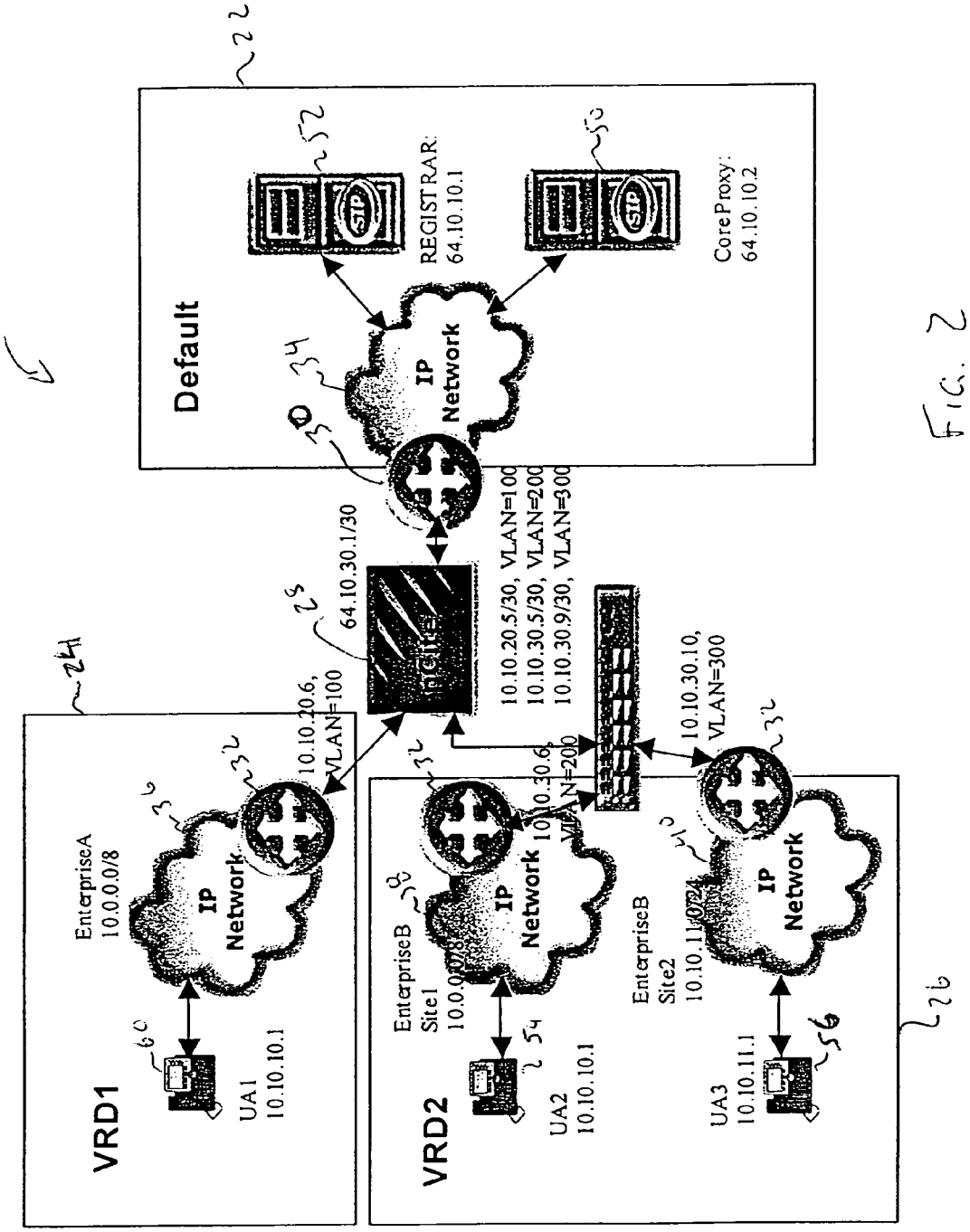
FIG. 2 is a simplified network diagram illustrating a network structure implementing the virtual routing domains according to the present invention.

Referring now to FIG. 2, a simplified network diagram showing a network implemented with a network processing system, which can be a session controller, which alleviates the problems described with reference to FIG. 1. Network 20 includes enterprise networks 36, 38 and 40, (which could be VPN-1, VPN-2, from FIG. 1) and carrier network 34. Enterprise network 36 interconnects network devices such as IP phones 60 and SIP proxy 58, and connects those devices to devices outside of enterprise network 36 through a customer edge router 32. Similarly, enterprise networks 38 and 40 interconnects network devices such as IP phones 54 and 56, also connecting those devices to devices outside of enterprise networks 38 and 40 through a customer edge routers 32.

Edge routers 32 for enterprise networks 36, 38 and 40 use TTN tunneling protocols shown here as having VLAN identifiers of 100, 200 and 300. Network processing system 28 is operationally connected to edge routers 32 and also connects to carrier network 34 using provider edge router 30. Other network devices such as SIP registrar 52 and SIP proxy 50 connect to carrier network 34.

Network 20 of FIG. 2 differs from network 10 of FIG. 1 by the presence of network processing system 28. Network processing system 28 allows the creation of virtual routing domains (VRDs) 22, 24, and 26, meaning that the network processing system 28 supports layer three routes for each VRD as if that VRD covers the whole IP address space. Each VRD has its own interfaces, route tables and derived forwarding tables associated with it. Additionally, each VRD can have one or more virtual proxies associated with it, each virtual proxy acting as an application proxy, for example a SIP proxy. The network processing system can create and support VRDs that have both public and private addressing schemes (non-overlapping and overlapping addresses), and can process applications that require both signaling and media traffic.

More significantly, the network processing system can route traffic across VRD boundaries. Previous virtual routing schemes have relied on level two and level three information to create the virtual routing functions, such as Cisco's Virtual Route Forwarding (VRF) scheme. This approach is limited because the scheme is unable to route information across the virtual boundaries because it does not have the information required to map overlapping IP address spaces, or to map destination address to the layer two tunneling protocol identifiers used across the virtual boundaries. The network processing system of the present invention, however, is able to use application information to determine layer two tagging information, and is able to map and route to over lapping IP address spaces while maintaining security between VRDs.

For example, IP phone 60 and IP phone 54 are in different enterprise networks using private IP addresses and have the same IP address 10.10.10.1. In the prior art network of FIG. 1, the network would be unable to route a VoIP call from IP phone 60 to IP phone 54. In the network of FIG. 2, however, network processing system 28 is able to route calls between the two phones even though they are in separate virtual routing domains 24 and 26, and have identical IP addresses. The network processing system 28 is able to this by using both TTN identifying information and by using information in the application layer, which is in this case the SIP signaling traffic that is used to set up the call.

Because the IP addresses are overlapping, network processing system 28 cannot route based solely on the destination IP address. Instead, network processing system 28 is able to use information in the SIP signaling traffic, such as the phone number of the called IP phone 54 to look up the customer or enterprise associated with that phone number. Network processing system 28 then uses the VRD associated with that customer to determine routing for the packets associated with the call, both signaling and media. The use of application information to cross VRD boundaries will be discussed in greater detail with reference to FIGS. 3-5.

Each VRD can have one or more virtual proxy associated with it. The virtual proxies ("VPs") act as application proxies, such as a SIP proxy, for devices in the VRD. The virtual proxies are able to provide security for the devices in the VRD by concealing the actual IP addresses of the devices from devices outside the VRD or devices on the public network. The VPs of network processing system 28 are able to route across multiple domains using network processing system 28's ability to route using information beyond the layer 3 routing information.

Additionally, the VPs of network processing system 28 can have other functions that provide additional protections or security to the network processing system or the network traffic. The VPs can be programmed to provide resource limits on the traffic passing through them. For example, a VP can be configured with a maximum bandwidth either for the entire VP or for individual connections within the VP. A maximum bandwidth for the entire VP can prevent denial of service attacks from consuming the entire resources of the network processing system by limiting the attack to the maximum bandwidth of the VP handling the connection that is being attacked. A maximum bandwidth for individual connections can ensure that someone paying for a low-bandwidth voice connection cannot use it to send high-bandwidth streaming video, thereby ensuring that the service provider keeps control over its resources. While resource limitation is described using the example of bandwidth other limits can be used in the same manner, such as TCP connection limits, concurrent call or connection limits, or transaction limits.

VPs can perform session routing. Session routing allows each VP to include its own routing information different than the routing information for other VPs or the default routing information for the network processing system. This allows each VP to be programmed to provide customized routing instructions. For example, traffic assigned to one VP which belongs to one customer can be routed to preferred network or VoIP provider, while the traffic assigned to another VP can be routed to a default network provider using the session routing tables in each VP.

The VPs may also be employed in either a stateful proxy mode in which it maintains the state of the connections it is responsible for, or a VP may be employed in a back-to-back user agent mode. The back-to-back user agent mode prevents either end of a connection from obtaining any information about the other end. Each end can only see the VP as the VP acts as intermediate termination/origination point between each end of the connection.

VPs can also be used to administer use of DiffServ code points used by routers and switches in the network to provide class-of-service/quality-of-service for media and signaling traffic into the VRD associated with the VP. VPs can enhance security by setting up separate but unique mutually authenticated security associations with call control elements within the network. These security associations forces those call control elements to work only with authenticated resources and allows each VP to establish it's own set of confidentiality and integrity algorithms as required by its associated VRD.

Network processing system 28 has the ability not only to route traffic between VRDs based on application information such as the telephone number of an IP phone, but also on domain name server ("DNS") information that exists in each network. Network processing system 28 can use the DNS infrastructure for routing SIP requests and responses and supports multiple VRDs, each VRD with potentially overlapping address domain space. This means that network processing system 28 must support DNS servers located in each VRD. The network processing system also must decide which DNS server to contact to resolve the domain names, such as those in the request-uri or VIA header of a SIP call. Network processing system 28 will select the DNS server for the query by comparing the configured domain names for the DNS server with the domain name in the application packet such as the request-uri of the initial request. If there is no match between configured domain names and the domain name in the application packets then the network processing system will contact the DNS servers in default VRD such as VRD 22 in FIG. 2.

The network processing system 28 is also able, through its support of virtual proxies, to support customer based routing. Customer based routing means that each VRD, or VP, can set up its own routing rules for traffic coming from its VRD. For example, VoIP calls from different VRDs but destined for the same number can be routed differently based on the rules set for the customer. A call from one VRD can be routed through a preferred provider with better quality of service before going to the intended callee, while a second call from a different VRD may be routed through a default route using an older network with lesser quality of service. This VRD dependent routing is referred to as session routing.

The network processing system is also able to extend the session routing concept to support session target routing and method based routing. Session target routing refers to a route object that is comprised of multiple pieces of equipment instead of a single box. The network processing system can be provisioned to keep track of each flow sent to each box in the target set and then to automatically load balance across the target set. The load balancing can be accomplished by using any of the well known load balancing techniques. Further, dissimilar capacities in the target set can be provisioned to allow traffic to be routed on that basis.

Method based routing refers to the ability of the network processing system to route based on the nature of the traffic itself. For example, in a SIP call, different types of signaling packets can be routed by type. For example, SIP INVITE packets can be routed to the appropriate proxy, while REGISTER packets can be sent directly to a registrar, and SUBSCRIBE and NOTIFY packets can be sent to a presentity server. While SIP calls and SIP signaling packets have been used for examples, one skilled in the art would recognize that the technique could be applied to any type of network traffic.

The network processing system can also independently maintain status on the health of the network. The system is able to query other equipment, such as routers, switches, etc., within the network and determine, by the lack of response to its query, whether the equipment is functioning properly. If a piece of equipment is determined to be down, or malfunctioning, the network processing system can dynamically reroute around that piece of equipment using its own routing priorities without having to wait for routing instructions from the network which can take a long time to occur.

The network processing system is also able to support multiple codecs and to provide for translation between codecs when necessary. For example, suppose VRD1 24 of FIG. 2 is a network for a customer based in Europe, while VRD2 26 is a U.S. based customer. A call routed from IP phone 54 in VRD2 26 in the United States to IP phone 60 in VRD1 24 in Europe might have issues with the different codecs used in each region. The United States uses a G711ulaw codec while Europe uses G729 which has less bandwidth. In the current example, the network processing system 28 can recognize that IP phone 54 uses a different codec than the destination IP phone 60 and send the media stream to a transcoder for translation.

Figures 3, 4:
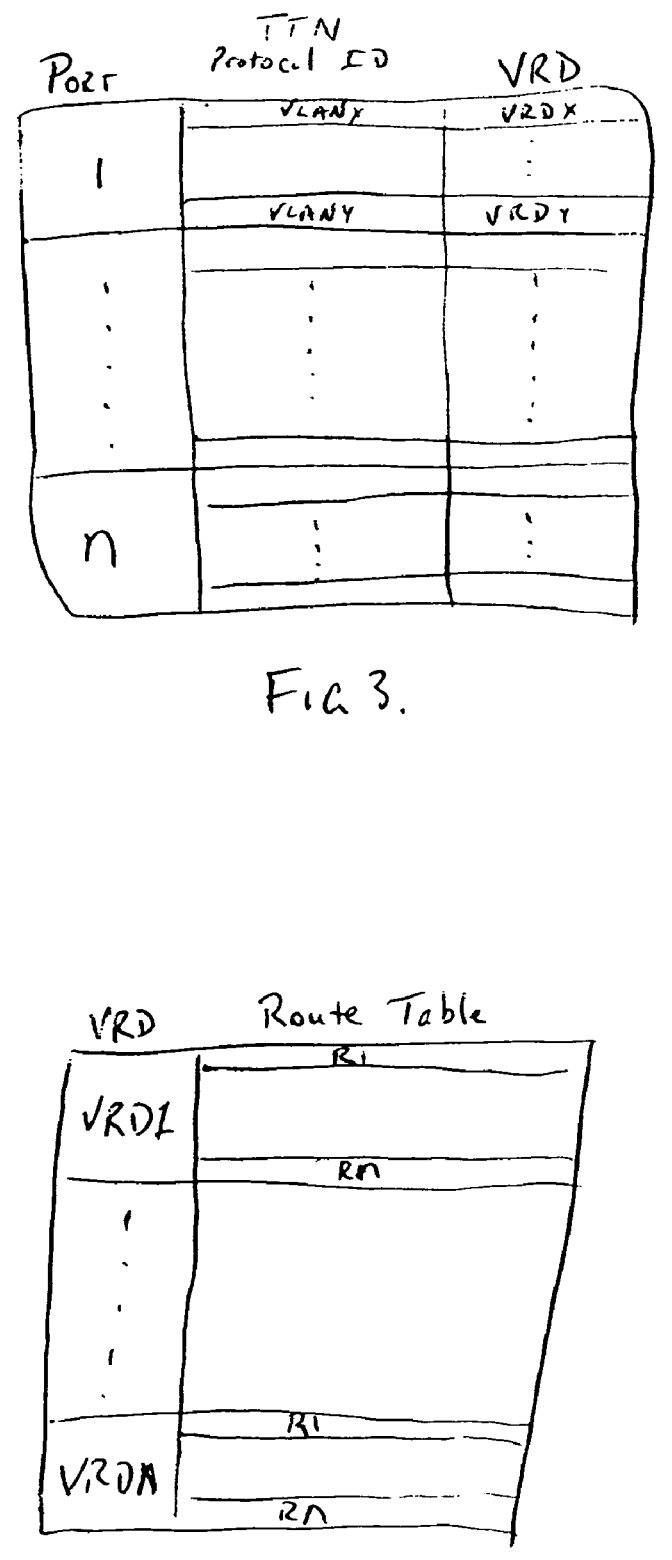

Referring now to FIGS. 3 and 4, the mapping inside network processing system 28 from FIG. 2 that allows for the creation of virtual routing domains in accordance with the present invention is shown. FIG. 3 shows the mapping on the ingress side of the network processing system that allows ingress traffic to be associated with a VRD. Traffic enters or ingresses, network processing system 28 on a specific logical interface on a specific port based on the source of that traffic. The traffic also has a tunneled traffic network identifier shown as TTNx through TTNy, such as a VPN, VLAN, MPLS or other identifier, as part of the header in each packet of the traffic. The logical interface/port information can be mapped along with the layer two tunneling protocol information to a VRD identifier shown as VRDx through VRDy unique to the customer from which the traffic is received. That VRD identifier can be added, or tagged, to the packet for processing by the network processing system. As shown in the table of FIG. 3 this mapping can occur for n ports and TTN combinations yielding n VRD identifiers. This tagging results in a packet with the fields:

| Port | Layer 2 | TTN | ... | VRD |
| --- | --- | --- | --- | --- |

The ingress table of FIG. 3 is created by configuring each logical interface to specify PORT, and TTN to a particular VRD. By specifying a VRD for each PORT/TTN combination a virtual routing domain is created for the customer associated with that PORT/TTN combination.

For virtual routing domains to enable the additional services described above, the network processing system must be able to map outgoing, or egress traffic to a destination VRD. Since the destination address in the packet header could be a private, non-routable, address, or a public address supplied by a NAT/NAPT device or proxy, it cannot always be used to map to a destination VRD. Instead, the network processing system must be able to look beyond the layer two and layer three information into the layer seven, or application information, to determine a destination that can be associated with a particular customer or VRD.

Network processing system 28 of FIG. 2 is able to examine application information for the flows passing through it, and pull out information necessary to determine and end destination or customer. The ingress VRD and the destination address allow the network processing system to determine the associated virtual proxy, and therefore, the customer specific associations for that traffic and customer. Using that information the network processing system can map to an egress VRD and application next hop information which can then be used to route the flows as discussed in FIG. 4.

Using a SIP message as an example, the network processing system is able to recognize and examine a SIP INVITE packet and to pull destination/callee information from the contents of the packet. The network processing system is then able to match that destination/callee information to its associated end user/customer. As stated, each customer has a unique VRD identifier associated with it. The destination VRD identifier can then be associated with the network traffic for that flow. In addition, the network processing system can use the information from control packets, such as SIP control packets, to treat packets in the associated media stream, such as the RTP traffic carrying the actual voice information. Once the destination VRD has been determined the network processing system can treat the flow traffic on the egress side.

FIG. 4 shows a table which performs this egress mapping for the virtual routing domains. Once the destination VRD identifier, shown as VRD1 through VRDn, has been obtained, as described above, it can be used with the destination address to look up layer three routing information, R1 to Rn, according to the route table associated with that VRD. The route table will provide next hop information for the packet. Each next hop can be matched against the provisioned logical interface on an egress port, and that logical interface will be associated with a layer two tunneling protocol identifier which can then be used to tag the packet accordingly.

The ingress to egress mapping described with reference to FIGS. 3 and 4 allow for packets to be seamlessly routed across virtual routing domains, and TTNs while maintaining the security of those domains, and even though those domains may contain overlapping private address space. Prior implementations of virtual forwarding/routing schemes have never been able to pass information between private networks as is capable with the present invention. Even packets and flows such as ICMP ping packets, UDP flows and TCP flows can be routed across VRDs using the techniques described above.

Figure 5:
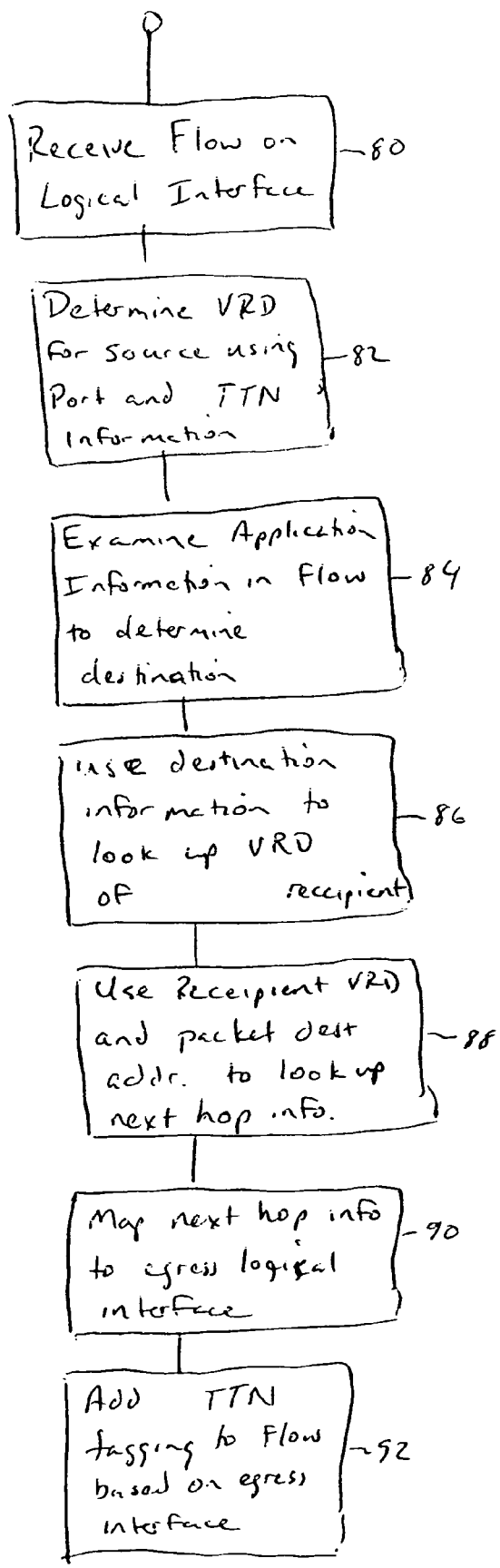
FIG. 5 is a flow chart showing a method of routing flows across virtual routing domain boundaries.

Referring now to FIG. 5, a method for creating virtual routing domains in an IP network is shown. The method begins with block 80 where the network processing system 28 from FIG. 2 receives a packet flow on an input port configured into multiple logical interfaces. The method then passes to block 82 where the port/logical interface information is used with the TTN information, which as has be stated, could be VPN, VLAN, MPLS, or other similar information to map to a VRD identifier for the VRD associated with the source customer. Using the VRD for the customer the flow can then be processed and treated in accordance with the attributes associated with that customer, such as quality of service, available line limitations, customized dialing instructions, etc.

After the VRD for the source customer is determined the method passes to block 84 where the application information is examined to determine the destination information. The destination information could be the callee's phone number in the case of a SIP message, destination IP address, or other destination information which can then be looked up to find the associated customer. The associated customer will have its own VRD identifier, shown in block 86, which can then be used to determine the proper egress treatment.

The egress treatment begins in block 88 where the destination VRD and destination IP address are used to find next hop information. The next hop information maps to a logical interface on an egress port, shown by block 90. Finally, the logical interface information gives the TTN information which can then be added to the packets of the flow, as shown in block 92.

Figure 6:
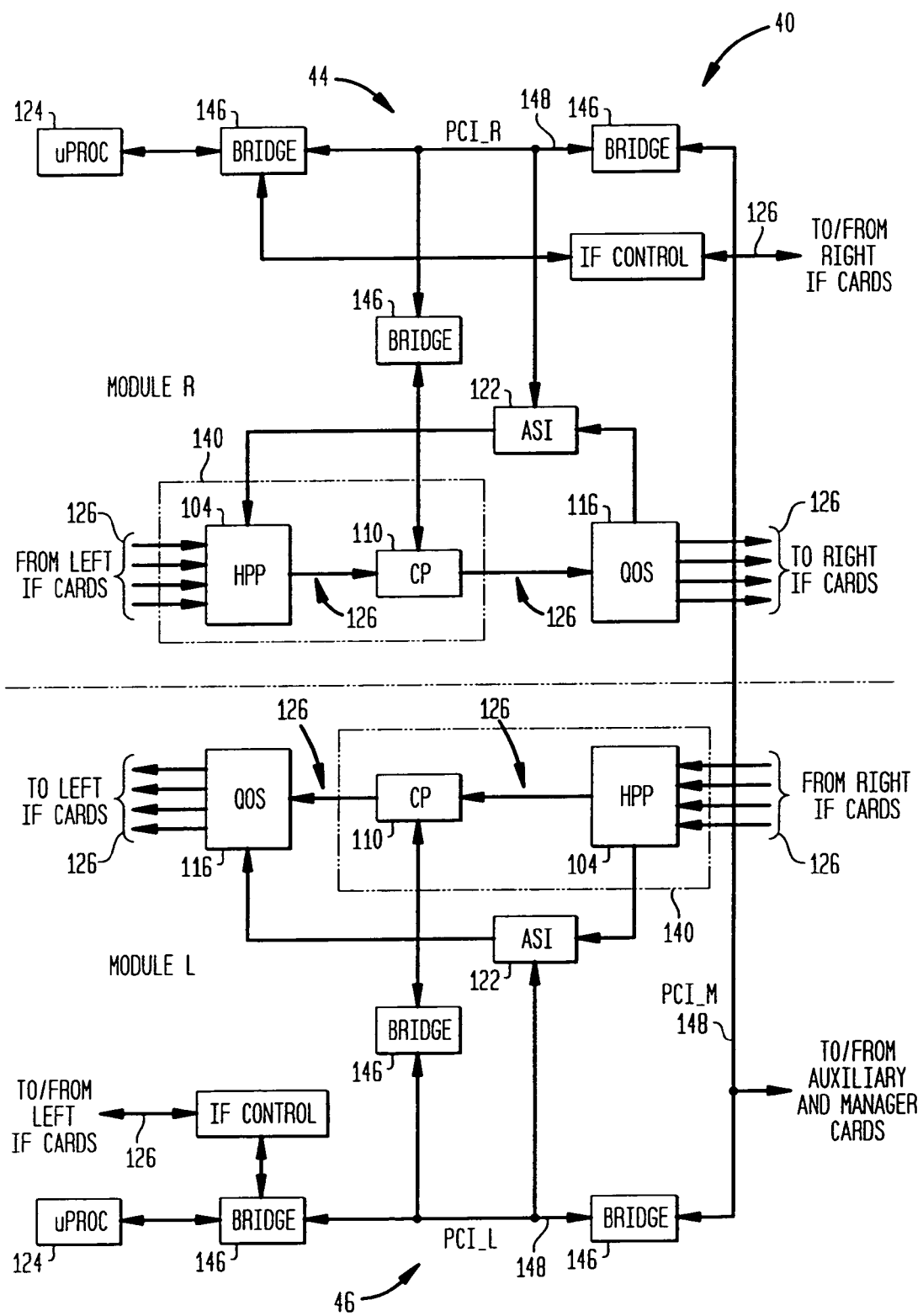
FIG. 6 is the network processing system shown in FIG. 2.

Referring now to FIG. 6, an example of a network processing system in accordance with the description of network processing system 28 of FIG. 2 is shown. Network processing system 28 includes two processing engines 44 and 46. Each of the processing engines is identical, and the operation of each will be discussed generally and any description of the operation of one processing engines will apply equally to both. Line interfaces, not shown, take the data from the physical ports, frames the data, and then formats the data for placement on fast-path data bus 126 which, as described, is preferably an industry standard data bus such as a POS-PHY Level 3, or an ATM UTOPIA Level 3 type data bus.

Fast-path data bus 126 feeds the data to traffic flow scanning processor 140, which in the preferred embodiment includes header preprocessor 104 and content processor 110, but can be a single processor such as the Intel IXP family of network processors. The data is first sent to header preprocessor 104, which is operable to perform several operations using information contained in the data packet headers. Header preprocessor 104 stores the received data packets in a packet storage memory associated with header preprocessor 104, and scans the header information. The header information is scanned to identify the type, or protocol, of the data packet, which is used to determine routing information and to decode the IP header starting byte.

After data packets have been processed by header preprocessor 104 the data packets, and any conclusion formed by the header preprocessor, such as QoS information, are sent on fast-data path 126 to the other half of traffic flow scanning engine 140, content processor 110. The received packets are stored in packet storage memory (not shown) while they are processed by content processor 110. Content processor 110 is operable to scan the contents of data packets received from header preprocessor 104. The header is scanned as well, one goal of which is to create a session id using predetermined attributes of the data packet.

In the preferred embodiment, a session id is created using session information consisting of the source address, destination address, source port, destination port and protocol, although one skilled in the art would understand that a session id could be created using any subset of fields listed, or any additional fields in the data packet, without departing from the scope of the present invention. When a data packet is received that has new session information the header preprocessor creates a unique session id to identify that particular traffic flow. Each successive data packet with the same session information is assigned the same session id to identify each packet within that flow. Session ids are retired when the particular traffic flow is ended through an explicit action, or when the traffic flow times out, meaning that a data packet for that traffic flow has not been received within a predetermined amount of time. While the session id is discussed herein as being created by the header preprocessor 104, the session id can be created anywhere in traffic flow scanning engine 140 including in content processor 110.

The contents of any or all data packets are compared to a database of known signatures, and if the contents of a data packet, or packets, match a known signature, an action associated with that signature and/or session id can be taken by the processing engine. Additionally, content processor 110 is operable to maintain state awareness throughout each individual traffic flow. In other words, content processor 110 maintains a database for each session which stores state information related to not only the current data packets from a traffic flow, but state information related to the entirety of the traffic flow. This allows network processing system 28 to act not only based on the content of the data packets being scanned but also based on the contents of the entire traffic flow.

Once the contents of the packets have been scanned and a conclusion reached by traffic flow scanning engine 140, the packets and the associated conclusions of either or both the header preprocessor 104 and the content processor 110 are sent to quality of service (QoS) processor 116. QoS processor 116 again stores the packets in its own packet storage memory for forwarding. QoS processor 116 is operable to perform the traffic flow management for the stream of data packets processed by network processing system 28. QoS processor contains engines for traffic management, traffic shaping and packet modification.

QoS processor 116 takes the conclusion of either or both of header preprocessor 104 and content processor 110 and assigns the data packet to one of its internal quality of service queues based on the conclusion. The quality of service queues can be assigned priority relative to one another, or can be assigned a maximum or minimum percentage of the traffic flow through the device. This allows QoS processor 116 to assign the necessary bandwidth to traffic flows such as VoIP, video and other flows with high quality and reliability requirements, while assigning remaining bandwidth to traffic flows with low quality requirements such as email and general web surfing to low priority queues. Information in queues that do not have the available bandwidth to transmit all the data currently residing in the queue according to the QoS engine is selectively discarded, thereby removing that data from the traffic flow.

The QoS queues in QoS processor 116 (there are 64 k queues in the present embodiment of the QoS processor, although any number of queues could be used) feed into schedulers (1024 in the present embodiment), which feed into logic ports (256 in the present embodiment), which send the data to flow control port managers (32 in the present embodiment) which can correspond to physical egress ports for the network device. The traffic management engine and the traffic shaping engine determine the operation of the schedulers and logic ports in order to maintain traffic flow in accordance with the programmed parameters.

QoS processor 116 also includes a packet modification engine, which is operable to modify, add, or delete bits in any of the fields of a data packet. This allows QoS processor 116 to change DiffServ bits, or to place the appropriate MPLS shims, or TTN tag on the data packets for the required treatment. The packet modification engine in QoS processor 116 can also be used to change information within the payload itself if necessary. Data packets are then sent along fast-data path 126 to output to the associated line interfaces, where it is converted back into an analog signal and placed on the network.

As with all network equipment, a certain amount of network traffic will not be able to be processed along fast-data path 126. This traffic will need to be processed by on-board microprocessor 124. The fast-path traffic flow scanning engine 140 and QoS processor 116 send packets requiring additional processing to flow management processor 122, which forwards them to microprocessor 124 for processing. The microprocessor 124 then communicates back to traffic flow scanning engine 140 and QoS processor 116 through flow management processor 122. Traffic flow scanning engine 140 is also operable to collect data and statistics on the nature of the traffic flow through the processing engine 40. Bridges 146 are used between elements to act as buffers on PCI buses 148 in order to prevent the loss of data that could occur during a flood of the PCI bus.

As can be seen from the description of FIG. 6, learning state machines 44 and 46 allow the entire contents of any or all data packets received to be scanned against a database of known signatures. The scanned contents can be any variable or arbitrary length and can even cross packet boundaries. The abilities of learning state machines 44 and 46 allow the construction of a network device that is intelligent and state-aware, and gives the network device the ability to operate on data packets based not only on the contents of that data packet, but also on the contents of previous data packets from the same flow.

Some of the functions associated with network processing system 28 described with respect to FIG. 2 are implemented using microprocessor 124 from FIG. 6. The traffic associated with network processing system 28 from FIG. 2 is received by the appropriate line interface 126 sent to the corresponding processing engine 44 or 46, where it is recognized and, if necessary, pulled from the fast-path. The traffic is then sent to microprocessor 124 where it is processed and the appropriate steps are taken.

Referring now to FIG. 7, a block diagram of the flow of TTN traffic through the internal software in network processing system 28 from FIG. 2 is shown. While FIG. 6 will be described with reference to an inbound voice-over-IP call, one skilled in the art will easily recognize that the description applies to any layer two tunneling protocol and that the direction of any signal referenced herein could have a counterpart in the opposite direction. Also, in discussing FIG. 7 reference will be made to reference numbers and the description from FIGS. 2 and 6.

VLAN 200, shown by network 504, and VLAN 300, shown by network 506, connect to the software data plane 508 of network processing system 28, as described with reference to FIG. 6, through router 502. Though reference is made to VLANs 200 and 300, networks 504 and 506 could be any type of TTN as described above. Outbound traffic from either VLAN 200 or VLAN 300 enters data plane 508 through line card 510 which serves as the network interface to data plane 508. The outbound traffic then passes though the outbound portion of data plan 508 which includes forwarding tables 514, access control list 516, policy block 518, PID 520, and DID 522. Forwarding tables 514 and access control lists 516 help determine routing information for the outbound traffic, while policy block 518 is used to apply programmed policies to the traffic, which can include such policies as bandwidth or session management. PID 520 and DID 522 collect information on the traffic related to policy enforcement and statistical information.

Traffic that requires processing outside data plan 508, such as traffic belonging to applications such as VoIP calls, are routed out of data plan 508 to MP line card driver 534 which manages traffic flowing between data plan 508 and microprocessor 124 from FIG. 3. Each VLAN supported by network processing system 28 has its own VLAN driver, shown here as VLAN driver 536 for VLAN 200 and VLAN driver 548 for VLAN 300. Traffic for each VLAN is sent to its appropriate driver and then sent to IP Table Filter IN 538 and 550 which filter the traffic before it is passed to IP stack 540. IP stack 540 and IP rules 542 operate too process the traffic as appropriate, as described with reference to FIG. 4, and pass the traffic on to user application socket 544 and 556, where application specific processing occurs. The traffic is then passed back through IP stack 540 to IP Table filter OUT 546 and 552, trough TTN drivers 536 and 548 and back to MP line card 534 where it is place back into data plane 508 for transmission through line card 512.

Inbound traffic passes though the inbound side of data plan 508 which includes forwarding tables 524, access control lists 526, Policy block 528, PID 530 and DID 532. Traffic requiring processing by microprocessor 124 from FIG. 3 is passed to MP line card driver 534 and through the same elements as described above for outbound traffic.

The description of FIG. 7 is only intended to serve as an example of the data flow through the internal software layers of network processing system 28. One skilled in the art would recognize that different applications, network configurations, data types, etc., would change the exact modules and path through which the data would pass. The description of FIG. 6 is not meant to be limiting, and all other applications, network configurations, data types, etc. are within the scope of the present invention.

While the network processing system of the present invention has been described in detail, it has many other capabilities and functions which are described in U.S. patent application Ser. No. 09/832,670, entitled Policy Gateway, and U.S. patent application Ser. No. 10/890,888, entitled Apparatus and Method for Mapping Overlapping Internet Protocol Addressed Layer Two Tunneling Protocols.

While the header preprocessor, the QoS processors, and the flow management processor described with reference to FIG. 6 can be any suitable processor capable of executing the described functions, which could be any of the well known network processors from Intel or Agere. The microprocessor described with reference to FIG. 6 could be any suitable microprocessor including the PowerPC line of microprocessors from Motorola, Inc., or the X86 or Pentium line of microprocessors available from Intel Corporation. Although particular references have been made to specific protocols such as SIP, H323, or MGCP, implementations and materials, those skilled in the art should understand that the network processing system can function independent of protocol, and in a variety of different implementations without departing from the scope of the invention.

Although the present invention has been described in detail, those skilled in the art should understand that they can make various changes, substitutions and alterations herein without departing from the spirit and scope of the invention in its broadest form.

We claim:

1. A method for creating virtual routing domains in an internet protocol network comprising:

associating a first and a second virtual routing domain identifiers with a virtual routing domain, the virtual routing domain including a public and a private address space, wherein the private address space includes overlapping addresses and is routable across the entire virtual routing domain without using network address translation;

mapping ingress interface and tunneling protocol identifying information for a network flow to the first virtual routing domain identifier; and using layer seven information within the network flow to identify a destination for the network flow, the destination associated with the second virtual routing domain identifier; and mapping egress information to the second virtual routing domain identifier; and routing the network flow based on the second virtual routing domain identifier.

2. The method of claim 1 wherein the method is performed by a network processing system at the edge of a provider network.

3. The method of claim 2 wherein the network processing system is able to route from a virtual routing domain based on the type of traffic being routed.

4. The method of claim 1 further comprising multiple virtual routing domains, wherein routing the network flow can pass flows between different virtual routing domains.

5. The method of claim 1 wherein the routing of the network flow is determined by policies assigned to a customer associated with the second virtual routing domain identifier.

6. The method of claim 5 wherein the policies include bandwidth limitations, quality of service settings, and forwarding assignments.

7. The method of claim 1 further comprising multiple virtual routing domains, wherein routing the network flow is based on session target sets.

8. A network processing system comprising:
an ingress port for receiving a tunneled network traffic flow, the tunneled network traffic flow including layer two tunneling protocol identifying information;
a virtual routing table associated with a virtual routing domain, the virtual routing domain including a public and a private address space, wherein the private address space includes overlapping addresses and is routable across the entire virtual routing domain without using network address translation; the virtual routing table including:
a first virtual routing domain identifier associated with the ingress port and layer two tunneling protocol information from the tunneled network traffic flow;
a second virtual domain identifier associated with layer seven destination information within the tunneled network traffic flow;
a virtual router using the second virtual domain identifier to determine egress treatment for the flows; and
egress ports for forwarding the tunneled network traffic flow.

9. The network processing system of claim 8 wherein the network processing system is at the edge of a provider network and is the sole contact point for each virtual routing domain.

10. The network processing system of claim 8 wherein the network processing system is able to route the flows across multiple virtual routing domains.

11. The network processing system of claim 8 further comprising multiple virtual routing domains, wherein the virtual routing table is different for each virtual routing domain on the network processing system.

12. The network processing system of claim 8 wherein egress treatment for the flows includes treatment based on policies set for a second virtual routing domain to which the flows are forwarded.

13. The network processing system of claim 12 wherein the policies include bandwidth limitations, quality of service settings, and forwarding assignments.

14. The network processing system of claim 8, wherein the virtual router forwards the tunneled network traffic flow based on session target sets.

15. The network processing system of claim 8, wherein the virtual router forwards the tunneled network traffic flow based on the type of traffic in the flow.

* * * * *